Figure 1:
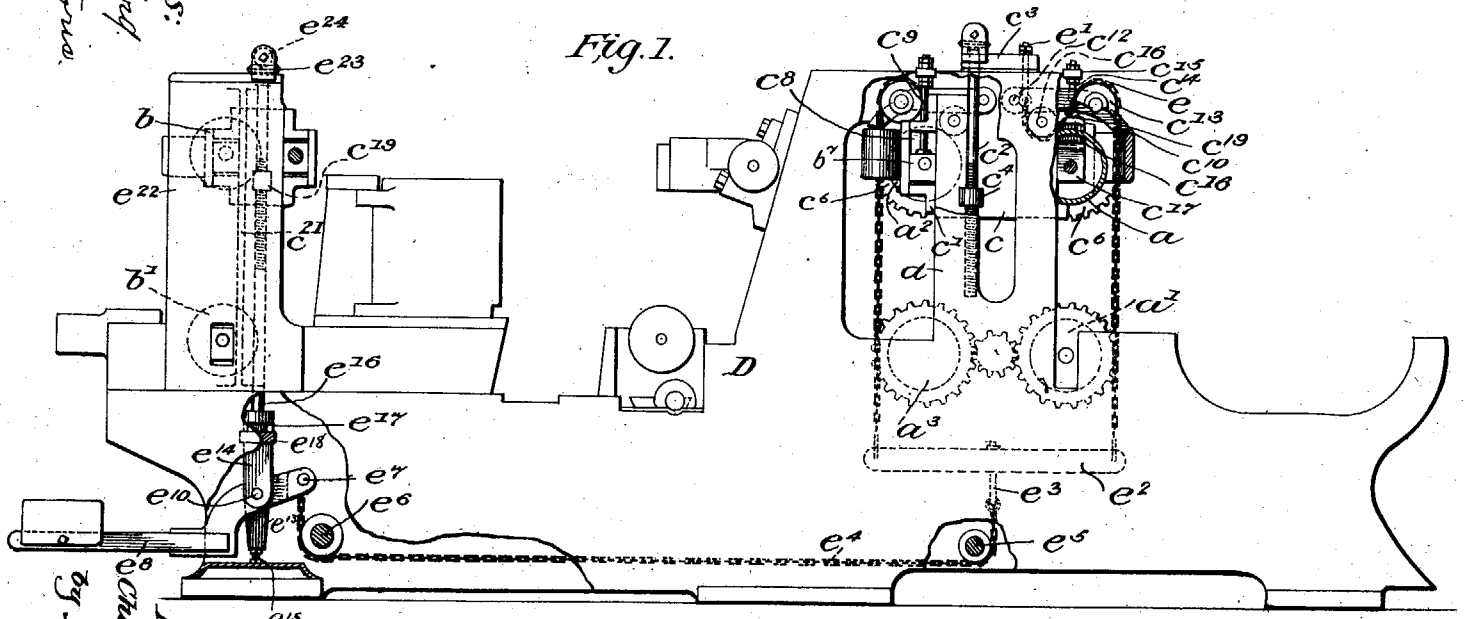

No. 11,984. Reissued May 13, 1902.

C. W. H. BLOOD.

FEED ROLLS.

(Application filed Apr. 15, 1902.)

4 Sheets—Sheet 1.

Witnesses:
W. C. Sunsford
H. J. Sartorio.

Inventor:
Charles W. H. Blood,
by Crosby & Gregory
Atty's.

THE NORRIS PETERS CO., PHOTO-LITHO., WASHINGTON, D. C.

No. 11,984. Reissued May 13, 1902.

C. W. H. BLOOD.

FEED ROLLS.

(Application filed Apr. 15, 1902.)

4 Sheets—Sheet 2.

Witnesses:
H. C. Lunsford.
H. J. Sartorius.

Inventor:
Charles W. H. Blood,
by Crosby & Gregory.
Attys.

THE NORRIS PETERS CO., PHOTO-LITHO., WASHINGTON, D. C.

No. 11,984.

Reissued May 13, 1902.

C. W. H. BLOOD.

FEED ROLLS.

(Application filed Apr. 15, 1902.)

4 Sheets—Sheet 3.

Witnesses:
W. C. Sunsford
H. J. Sartoris.

Inventor:
Charles W. H. Blood,
by Crosby & Gregory.
Atty's.

THE NORRIS PETERS CO., PHOTO-LITHO., WASHINGTON, D. C.

No. 11,984. Reissued May 13, 1902.

C. W. H. BLOOD.

FEED ROLLS.

(Application filed Apr. 15, 1902.)

4 Sheets—Sheet 4.

Witnesses:
H. C. Sumsford.
H. J. Sartorio.

Inventor:
Charles W. H. Blood,
by Crosby & Gregory.
Atty's.

THE NORRIS PETERS CO., PHOTO-LITHO., WASHINGTON, D. C.

UNITED STATES PATENT OFFICE.

CHARLES W. H. BLOOD, OF BOSTON, MASSACHUSETTS, ASSIGNOR TO THE S. A. WOODS MACHINE COMPANY, OF BOSTON, MASSACHUSETTS, A CORPORATION OF MASSACHUSETTS.

FEED-ROLLS.

SPECIFICATION forming part of Reissued Letters Patent No. 11,984, dated May 13, 1902.

Original No. 696,307, dated March 25, 1902. Application for reissue filed April 15, 1902. Serial No. 103,064.

*To all whom it may concern:*

Be it known that I, CHARLES W. H. BLOOD, a citizen of the United States, residing at Boston, county of Suffolk, State of Massachusetts, have invented an Improvement in Mechanism for Weighting the Feed-Rolls of a Planing-Machine, of which the following description, in connection with the accompanying drawings, is a specification, like letters on the drawings representing like parts.

My invention is an improvement in planing-machines, and relates more particularly to the means for weighting the feed-rolls of the machine.

In planing-machines having a plurality of upper feed-rolls together, usually at the feed-in end of the machine, a common construction is to have an adjusting-screw, lever, or set of levers for raising and lowering each feed-roll, and in some instances the bottom feed-rolls and bed are raised and lowered instead of the upper feed-rolls, and also when adjusting-screws are employed the screw yields or moves up and down, these constructions necessitating the moving up of the lever mechanism with the rolls or the supporting and moving up of various operating devices and other inconvenient arrangement and multiplicity of parts.

Accordingly it is the object of my invention to provide a single power-hoist, preferably in the form of a screw, which shall be stationary or not endwise movable, and pressure-transmitting mechanism which keeps proper pressure on the rolls regardless of the height of the rolls and yet permits the weights and weighting-levers to be below the work.

Figure 2:
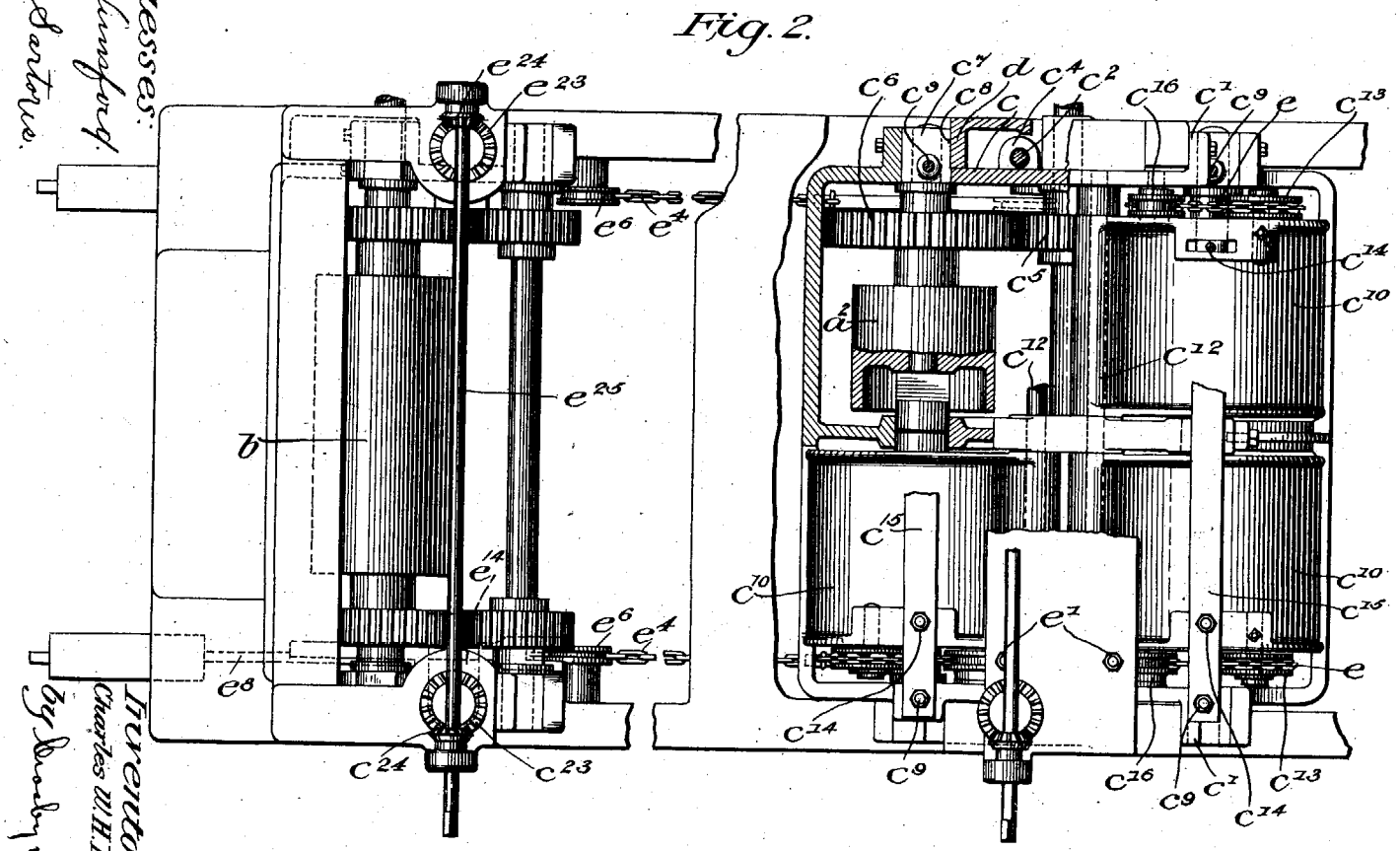
Figure 3:
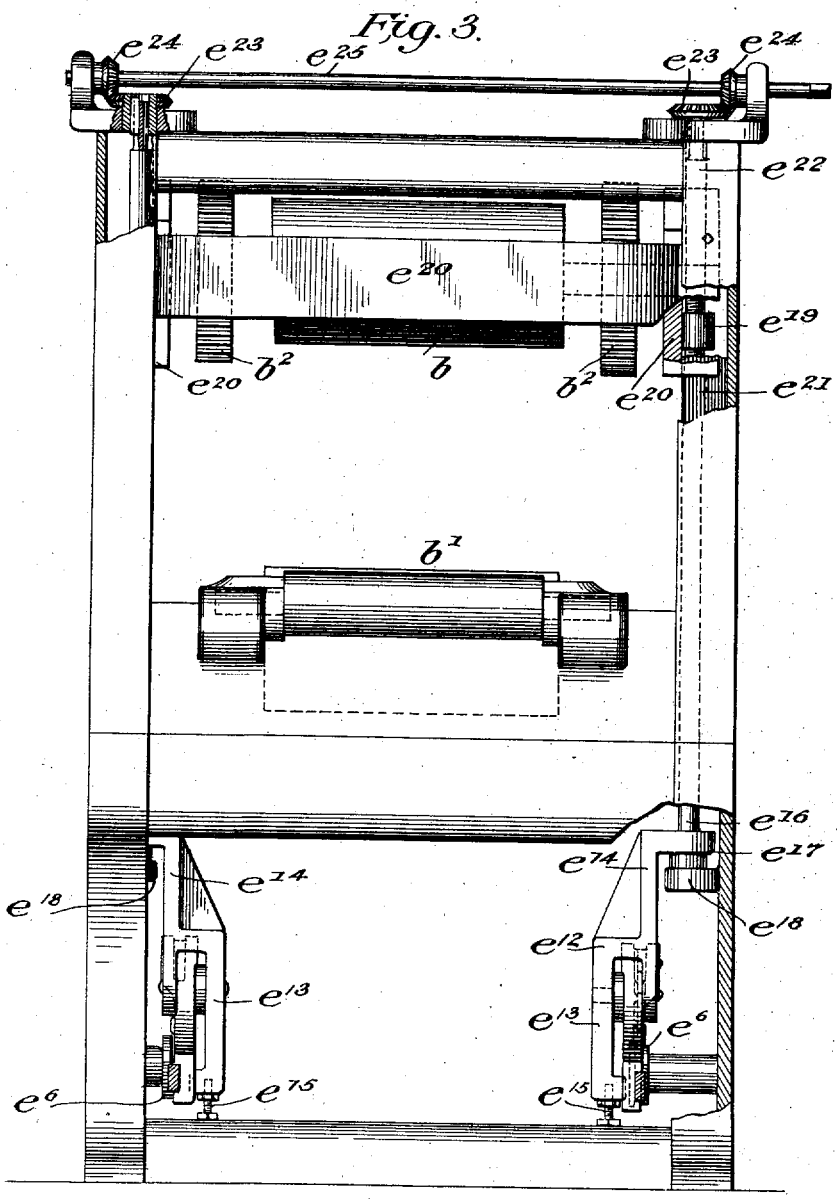
Figure 4:
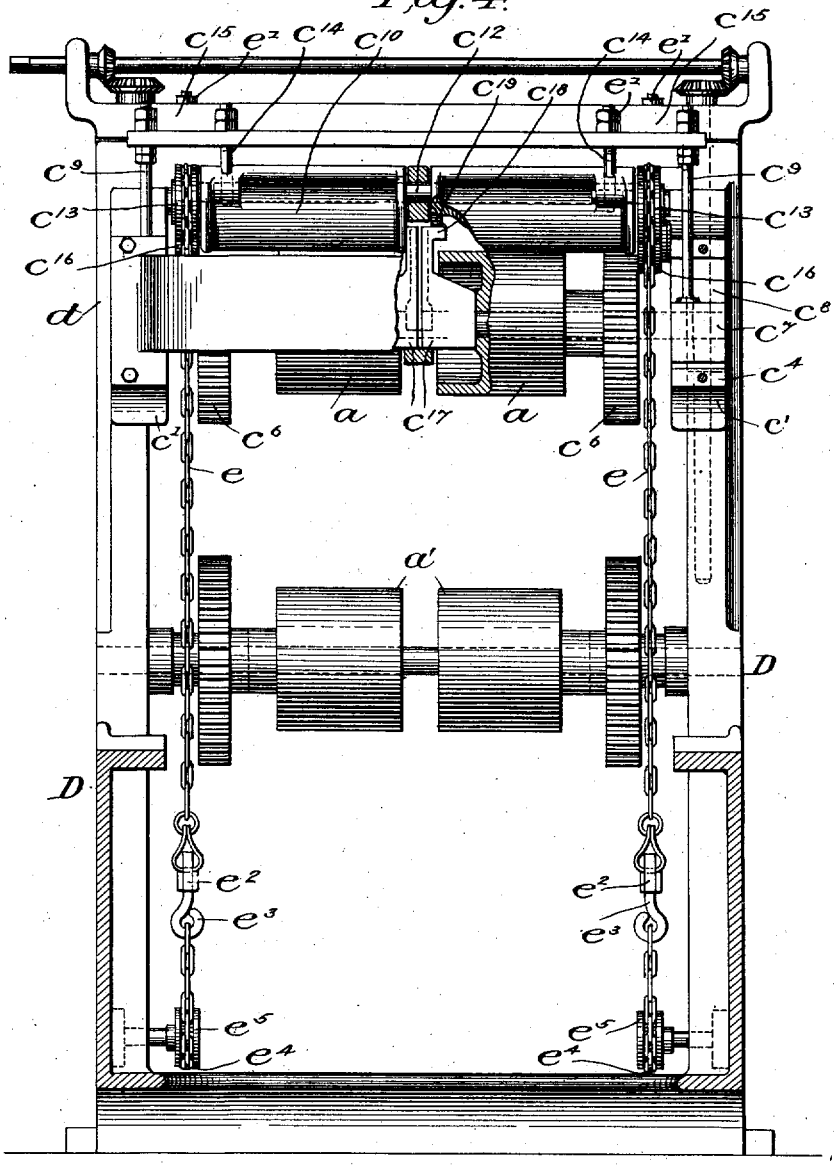

In the drawings in which I have shown a preferred embodiment of my invention, Figure 1 is a side elevation of a portion of the usual planing-machine provided with my invention, parts being broken away for clearness of illustration, and in said figure most of the operating parts of the machine are omitted. Fig. 2 is a top plan view thereof, parts being broken away and shown in section for clearness of illustration. Fig. 3 is a left-hand end elevation of Fig. 1, parts being broken away. Fig. 4 is a right-hand end elevation, parts being broken away and shown in section for purposes of illustration.

It will be understood that my invention is applicable to various kinds of planing-machines and their feed-rolls, the form thereof herein shown comprising two sets or a double set of feed-in rolls $a$ $a'$ $a^2$ $a^3$, each comprising two usual independent rolls and a single set of feed-out rolls $b$ $b'$. The upper pair of feed-in rolls are carried by a casting or saddle $c$, which is provided with ways $c'$, by which it may be adjusted up or down on guides $d$ of the main frame D of the machine, being adjusted by any suitable means, as by threaded rods $c^2$, supported on a cross-plate $c^3$, mounted at the top of the frame D and having threaded connection with ears $c^4$, projecting from the saddle opposite the ends thereof. The rolls are driven by pinions $c^5$, meshing with gears $c^6$ on the shafts of the rolls, and the journals $c^7$ of the rolls are preferably mounted adjustably in ways $c^8$, provided in the saddle, pressure being transmitted thereto by compression-bolts $c^9$. The respective rolls $a$ $a^2$ have above them pressure-transmitting devices, herein shown as comprising cover-plates $c^{10}$, pivoted on rods $c^{12}$ and carrying at their outer ends sheaves $c^{13}$, adjacent which are tension-bolts $c^{14}$, secured to cross-bars $c^{15}$, to the outer ends of which are also connected the bolts $c^9$, already mentioned. In line with the sheaves $c^{13}$ are relatively stationary sheaves $c^{16}$, carried directly by the saddle $c$, and under the sheaves $c^{16}$ and over the sheaves $c^{13}$ pass chains $e$, secured at their upper ends by bolts $e'$ in the cross-plate $c^3$. As herein shown, there are four of these chains in opposite pairs, said pairs being brought down beneath the lower feed-rolls and adjacent mechanism and connected to equalizing-bars $e^2$, from which depend suitable fastening means, as bolts $e^3$, to which are secured chains $e^4$, passing over guide-pulleys $e^5$ $e^6$ to the inner ends $e^7$ of the weight-levers $e^8$, said inner ends constituting one of the interchangeable fulcrums to which I have already referred.

From the foregoing description it will be readily understood that whenever one of the rolls $a$ $a$ $a^2$ $a^2$ is raised by the passage there-under of a timber the pressure is maintained uniform by the yielding of the pulley $c^{13}$, which is carried by the cover-plate $c^{10}$. The weight-pressure on the pulley $c^{13}$ holds down the cover $c^{10}$, and thereby through the bolts $c^{14}$ $c^{9}$ transmits an unvarying pressure to the rolls at their outer ends.

At their inner ends the rolls are provided with special bearings, (shown to best advantage in Fig. 4,) where it will be seen that they comprise lower journaled portions $c^{17}$ and upwardly-extending upper portions terminating in offset ends $c^{18}$, on which a depending flange or knuckle $c^{19}$ from the cover rests, so that the weight carried by the chains $e$ is transmitted by the pulley $c^{13}$ to the cover, and thence by the flange or knuckle $c^{19}$ to the journal-box containing the roll-shaft.

Referring now more particularly to Figs. 1, 3, and 4, it will be seen that the weight-levers are pivoted at $e^{10}$ in legs $e^{12}$, preferably provided with lower portions $e^{13}$ and upper portions $e^{14}$, the lower portion carrying an adjustable stop $e^{15}$ and the upper portion receiving loosely a shaft $e^{16}$, whose headed lower end $e^{17}$ is normally just above a bracket or ledge $e^{18}$ on the frame of the machine. The shaft $e^{16}$ has threaded connection at its upper end with a nut or lug $e^{19}$, projecting from a saddle or housing $e^{20}$, in which the roll $b$ is journaled, said rolls being driven in usual manner by gears $b^2$, and the opposite brackets $e^{20}$ sliding up and down in ways $e^{21}$ in the frame of the machine, the upper end of the shaft $e^{16}$ having telescoping connection, as clearly shown in Fig. 3, at its upper end with the shaft $e^{22}$ of a driving-gear therefor, the driving mechanism being shown as comprising miter-gears $e^{23}$ $e^{24}$, operated by a shaft $e^{25}$.

The reason for the adjustable stop $e^{15}$ is to insure normally a looseness between the end $e^{14}$ of the leg $e^{12}$ and the upper side of the head $e^{17}$, so that when the shaft $e^{25}$ is turned for adjusting the roll $b$ up or down said shaft will not meet the frictional resistance which would otherwise be produced by the weights causing the end $e^{14}$ to pinch on top of the head $e^{17}$.

The machine being constructed on the general principles as explained, it will be seen that whenever either pair of the feed-in rolls rises or falls on account of timbers being fed through the machine the corresponding weight-chains rise and fall and transmit their pressure without variation, the equalizing bar or bars $e^2$ yielding in either direction, as required, without producing any disturbance on the rolls, which are not required to change position, and as these movements take place the weight-lever $e^8$ is raised or lowered on the pivot $e^{10}$ as a fulcrum without in any wise changing the pressure on the feed-out rolls. Furthermore, when the feed-out rolls are raised or lowered by a change in thickness of a timber being fed out the shafts $e^{16}$ correspondingly rise or fall, thereby lifting or lowering the weight-levers $e^8$ on the pivots $e^7$ as fulcrums. The same weight, it will be observed, is applied to the feed-in rolls that is applied to the feed-out rolls, this being accomplished by the sheave arrangement, which operates to double the effect of the weight which was originally halved by the equalizer $e^2$. Also the pulley construction shown, in which the chains are fastened at one end in a vertical line directly above and in a line tangent to the pulleys $c^{16}$, which move up and down with the saddle $c$ and pass thence over the pulleys $c^{13}$, gives uniform tension at all positions of the saddle, because, irrespective of the changing position vertically of the pulleys $c^{16}$, the angle or leverage of the chain relatively to the pulley remains unchanged. This is of considerable practical value.

By my invention all the equalizing-weight is carried below and inside of the frame, thereby leaving all the upper and overhanging parts of the machine free and unobstructed, and, moreover, it will be observed that both of the rolls $a$ $a^2$ are raised and lowered together by a single power-hoist, (herein shown as a screw,) which is fixedly mounted on the frame of the machine, and the saddle or roll carrying means is movable or adjustable along said screw, the screw itself being relatively stationary, and that because of the chain arrangement the pressure on the rolls is maintained regardless of the height to which they may be moved by said screw and also regardless of their independent yielding movement for unevennesses of work being fed.

Having described my invention, what I claim as new, and desire to secure by Letters Patent, is—

1. In a planing-machine, a plurality of upper feed-rolls, an adjustable carrier for supporting said feed-rolls on the frame of the machine, said feed-rolls being independently movable in said adjustable carrier, a single power-hoist fixedly mounted on the frame of the machine and in engagement with said supporting means for adjusting the latter up and down while itself remaining vertically stationary, a weight and pressure-transmitting mechanism permitting said rolls to yield independently, including a connection from said weight to each of the upper feed-rolls, and means coöperating therewith enabling the weight to give uniform tension or pressure to all of said rolls in all positions.

2. In a planing-machine, a pair of upper feed-rolls, an adjustable carrier therefor, a weight located beneath the operating parts of the machine, and pressure-transmitting mechanism, including a chain, an equalizer, a chain-pulley fixed on said carrier, a chain-pulley movable relatively to said carrier, all coöperating with the chain, the equalizer and movable pulley yielding when a roll moves independently of the carrier.

3. In a planing-machine, a plurality of feed-rolls each movable up and down, a weight, connections between said weight and said several rolls, including pressure-transmitting devices for certain of said rolls, comprising means bearing down on the rolls, a pulley carried by said bearing-down means, and a chain passing over said pulley and connected with the weight for transmitting the pressure of the latter through said pulley and bearing-down means to the rolls.

4. In a planing-machine, a feed-roll, a movable carrier therefor, in which said feed-roll is movable up and down, a weight, a pulley movable with said roll for transmitting pressure thereto, a second pulley mounted on said carrier and a chain extending under the latter pulley and over the former and passing from the pulleys in vertical tangents, being attached above said pulleys to the frame of the machine and below said pulleys to the weight.

5. In a planing-machine, a feed-roll, a movable carrier therefor in which said feed-roll is movable up and down, a weight, two pressure-transmitting pulleys, one above the other, the upper pulley being movable independently of the lower pulley, a weight, and a chain connected to the weight and passing up over the upper pulley and thence under the lower pulley and up vertically to a fixed point of the frame of the machine.

6. In a planing-machine, a feed-roll, a saddle in which said feed-roll is journaled, vertical guide-frames in which said saddle moves up and down, a pressure-transmitting device pivoted in said saddle and provided with means for transmitting equal pressure to the opposite ends of said roll, the said roll being free to move up and down in said saddle, a weight and a chain connection between said weight and said pivot device for transmitting the effect of said weight to said roll.

7. In a planing-machine, two feed-rolls placed end to end and mounted to move up and down, pivoted covers extending over said feed-rolls, a bar above said covers, a connection from said bar at the opposite ends of said rolls for the transmission of pressure from the bar to the rolls, connections between said covers and said bar, pulleys carried by said covers, a weight, and connections therefrom to said pulleys.

8. In a planing-machine, two feed-rolls placed end to end and mounted to move up and down, pivoted covers extending over said feed-rolls, contiguous journal-boxes for supporting the adjacent journal ends of said two rolls, said boxes extending above the rolls and said covers resting on said boxes, a bar above said covers, a connection from said bar at the opposite ends of said rolls for the transmission of pressure from the bar to the opposite ends of the rolls, connections between said covers and said bar, pulleys carried by said covers, a weight, and connections therefrom to said pulleys.

9. In a planing-machine, a feed-roll, a rod rigidly connected therewith and depending therefrom, a rigid bracket normally sustaining said rod and roll, a leg carried by said rod, a lever and weight pivoted intermediate its length to said leg and having its fulcrum at its end opposite the weight, and an adjustable stop for regulating the downward movement of said leg.

10. In a planing-machine, a feed-roll vertically movable by the passage of timber, a weight connected thereto by a flexible connection, means for vertically adjusting said feed-roll, mechanism coöperating with said vertical adjusting means and said movable roll for changing the relative position of said roll and connection as the roll moves up and down independently of said adjustment, and including means maintaining uniform tension of said weight on said roll at all positions assumed by the latter.

11. In a planing-machine, a feed-roll vertically movable, a weight connected thereto by a flexible connection, pressure-transmitting pulleys relatively movable, said flexible connection passing over one of said pulleys and under the other, and means coöperating therewith enabling said weight to give uniform tension or pressure to said roll at all positions of its movement.

In testimony whereof I have signed my name to this specification in the presence of two subscribing witnesses.

CHARLES W. H. BLOOD.

Witnesses:
GEO. H. MAXWELL,
GEO. W. GREGORY.